June 27, 1944.  G. SLAVICEK  2,352,501
WELD FABRICATED ROLL
Filed June 28, 1943
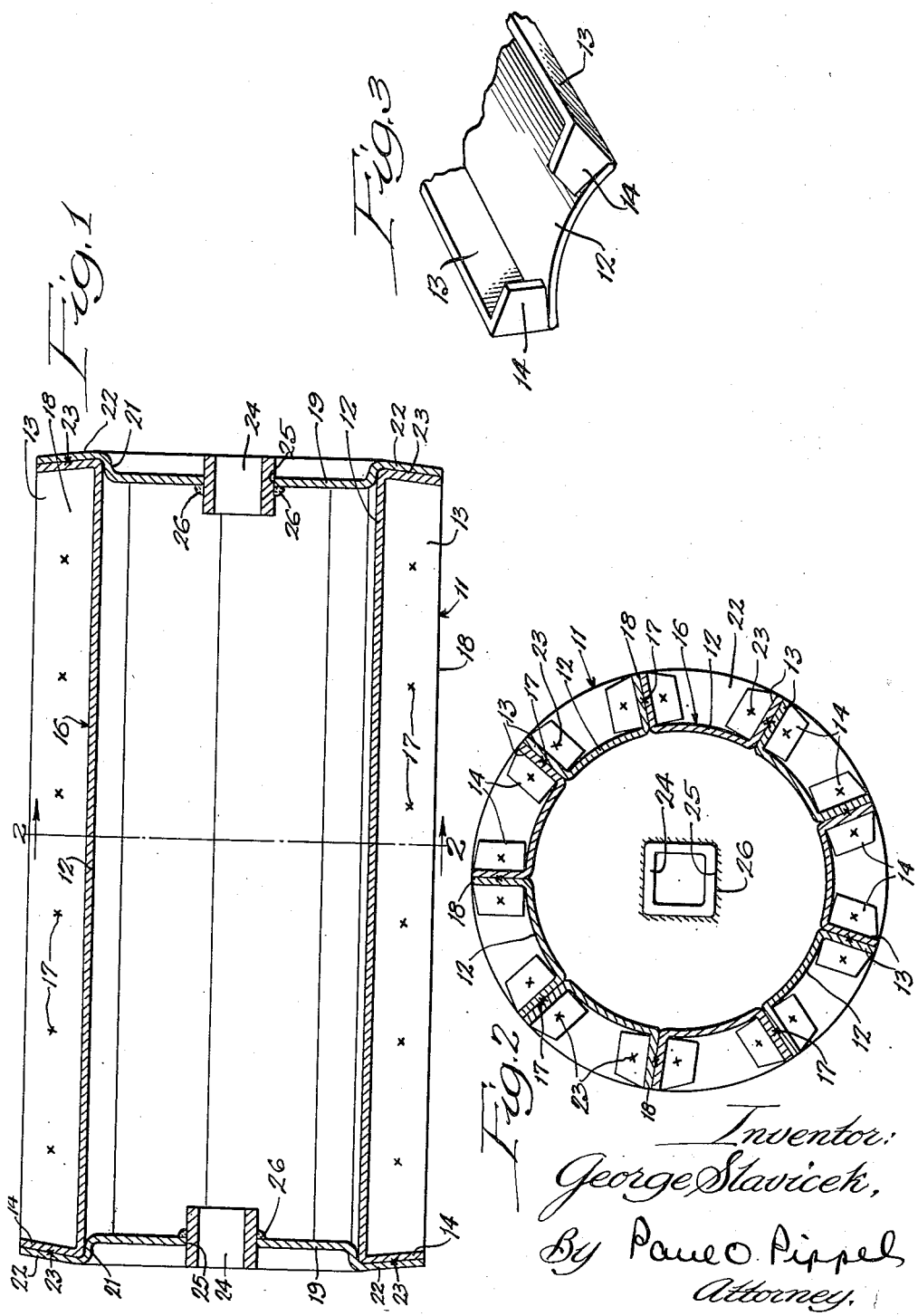
Inventor:
George Slavicek,
By Paul O. Pippel
Attorney.

Patented June 27, 1944

2,352,501

UNITED STATES PATENT OFFICE 2,352,501

WELD FABRICATED ROLL

George Slavicek, Berwyn, Ill., assignor to International Harvester Company, a corporation of New Jersey Application June 28, 1943, Serial No. 492,497

3 Claims. (Cl. 130—33)

This invention relates to a new and improved weld fabricated roll and has for one of its principal objects the provision of means for fabricating a roll having longitudinal ribs around the periphery thereof.

Fluted rolls have long been employed as feeding means in agricultural implements such as ensilage harvesters or the like. A feed roll of this type is ordinarily cylindrical in shape and possesses longitudinal ribs at intervals around the periphery, and by reason of such ribs the corn stalks may be aggressively fed to the cutting and chopping mechanism. Heretofore, these feed rolls have generally been made in the form of a solid casting, and at the present time there are two important reasons why the old type of roll does not adequately fill the present day requirements. First, the casting of iron or even some other metal produces a roll of prohibitive weight. Second, the present day economy of all metal prohibits the use of the quantity of metal necessary to make a solidly cast feed roll of this type. It is, therefore, an important object of this invention to provide a fluted feed roll which is light in construction and economical in the use of materials.

An important object of this invention is to provide a fabricated feed roll wherein the composite sections thereof are welded together and in so welding forms ribs running lengthwise of the fabricated roll.

Another and still further important object of this invention is to provide a weld fabricated roll having integral external ribs on a shell-like tube member with its ends enclosed.

Other and further important objects will become apparent from the disclosures in the following specification and accompanying drawing, in which:

Figure 1 is a longitudinal sectional view of the weld fabricated roll of this invention;

Figure 2 is a sectional view taken on the line 2—2 of Figure 1; and

Figure 3 is a detail perspective of one of the sections of the weld fabricated roll shown in Figures 1 and 2.

As shown in the drawing, reference numeral 11 indicates generally a feed roll, or the like, used in agricultural implements such as ensilage harvesters where it is desired to aggressively feed grain stalks. The roll 11 consists of a plurality of rectangularly shaped arcuate sections 12 having outwardly extending longitudinal flanges 13, which terminate in inwardly bent end portions 14, as best shown in Figure 3. These outwardly extending flanges are substantially at right angles to an imaginary tangent drawn at the point of the rising flange 13. The arcuate sections 12 each forms part of the circumference of a tube 16, as best shown in Figure 2. It will be realized, of course, that the tube formed need not be cylindrical but rather may be elliptical or some other shape, as desired. The arcuate sections 12 are concavo-convex in shape, and their width may be any part of the periphery of the tube. It is evident that the tube may comprise any number of sections, such as two, three, or four, and is not necessarily limited to the nine, as shown in the drawing.

The arcuate sections 12 are placed side-by-side, and the upwardly extending flanges 13 are spot welded together at 17. The type of welding is not important to the invention, and it is obvious that any form could be employed, such as arc or electric welding. As previously stated, the arcuate portions 12 form the internal tubular member 16, and the welded flanges act to give the tube 16 strength and rigidity as well as supply unitary longitudinal ribs 18 or feeding paddles, whereupon the roll may be employed in lieu of solidly cast rolls having fluted surfaces. These ribs 18, composed of two flanges 13, are relatively strong by reason of their double thickness.

The roll 11, comprising the shell-like structure consisting of numerous arcuate sections and welded flanges, is additionally reenforced by a pair of end cores 19 circular in shape in order to accommodate the cylindrical tube 16, or, if the tube is of some other shape, the cores are correspondingly shaped. The cores 19 are equipped with an annular offset shoulder 21, which is adapted to be inserted within the cylindrical tube 16, as shown in Figure 1. An outer annular rim 22, extending outwardly from the shoulder 21, is adapted to receive the inwardly bent end portions 14 of the flanges 13 in abutting relationship. The contact points between the end flanges 14 and the rim member 22 are welded, as shown at 23. Journal members 24, shown square in cross-section in Figure 2, are welded within central apertures 25 in the core members 19 at 26. These journal members 24 are adapted to be alined and receive a correspondingly shaped shaft in order to impart rotation to the fabricated feed roll. It is apparent that it is not necessary for these journal members to be square in cross-section but they may be any shape as desired, such as circular with a keyway and a correspondingly shaped key on the driving shaft.

I am aware that herein is provided a weld fabricated feed roll which may be constructed with numerous changes in detail, and I do not propose limiting the patent granted hereon otherwise than as necessitated by the appended claims.

What is claimed is:

1. A weld fabricated roll comprising a plurality of arcuate sections, said sections having outwardly bent flanges, said flanges running longitudinally of said sections and having inwardly bent ends, and a pair of end cores, said longitudinal flanges welded together and the inwardly bent ends welded to said end cores, whereby the resultant roll has a cylindrical tube with longitudinal external ribs.

2. A weld fabricated roll comprising a plurality of rectangularly shaped arcuate members, longitudinal flanges extending outwardly from the long parallel sides of the rectangularly shaped members, and inward extensions of said flanges at the ends thereof, said longitudinal flanges of the plurality of members welded together to form a tube having outwardly extending longitudinal flanges.

3. A weld fabricated roll comprising a plurality of rectangularly shaped arcuate members, longitudinal flanges extending outwardly from the long parallel sides of the rectangularly shaped members, inward extensions of said flanges at the ends thereof, said longitudinal flanges of the plurality of members welded together to form a tube having outwardly extending longitudinal flanges, a pair of end cores for said tube and welded to the inward extensions of said flange.

GEORGE SLAVICEK.